(12) United States Patent
Liu

(10) Patent No.: US 8,253,851 B2
(45) Date of Patent: Aug. 28, 2012

(54) KEYBOARD INTEGRATED WITH CAMERA MODULE

(75) Inventor: Yu-Rong Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 915 days.

(21) Appl. No.: 12/344,223

(22) Filed: Dec. 25, 2008

(65) Prior Publication Data

US 2010/0066569 A1    Mar. 18, 2010

(30) Foreign Application Priority Data

Sep. 12, 2008  (CN) .......................... 2008 1 0304485

(51) Int. Cl.
*H04N 5/225* (2006.01)
(52) U.S. Cl. .......................... 348/373; 348/374; 348/375
(58) Field of Classification Search ........... 348/371–375
See application file for complete search history.

(56) References Cited

U.S. PATENT DOCUMENTS

| | | | | |
|---|---|---|---|---|
| 4,134,105 A | * | 1/1979 | Stadler ............................ | 355/64 |
| 6,443,543 B1 | * | 9/2002 | Chiang ....................... | 312/223.3 |
| 6,587,151 B1 | * | 7/2003 | Cipolla et al. ................. | 348/373 |
| 6,686,956 B1 | * | 2/2004 | Prakash et al. .............. | 348/218.1 |
| 6,812,958 B1 | * | 11/2004 | Silvester ..................... | 348/207.1 |
| 6,992,721 B1 | * | 1/2006 | Kambayashi et al. ......... | 348/373 |
| 2002/0158987 A1 | * | 10/2002 | Shimizu ........................ | 348/364 |
| 2003/0085988 A1 | * | 5/2003 | Fujiwara ...................... | 348/14.1 |
| 2003/0164874 A1 | * | 9/2003 | Sawada ........................... | 348/36 |
| 2006/0098116 A1 | * | 5/2006 | Manico et al. ................ | 348/373 |
| 2008/0136973 A1 | * | 6/2008 | Park .............................. | 348/744 |

* cited by examiner

*Primary Examiner* — Timothy Edwards, Jr.
(74) *Attorney, Agent, or Firm* — Altis Law Group, Inc.

(57) ABSTRACT

A keyboard includes a keyboard body, and a camera module. The camera module includes a support, a receiving portion and a camera unit. The support includes a first connecting end and a first receiving end. The receiving portion includes a rotating end and an opposite second receiving end. The support is rotatably coupled to the keyboard body by the first connecting end. The rotating end is rotatably received in the first receiving end and the camera unit is received in the second receiving end.

10 Claims, 4 Drawing Sheets

KEYBOARD INTEGRATED WITH CAMERA MODULE

BACKGROUND

1. Technical Field

The present disclosure relates to a keyboard integrated with a camera module.

2. Description of the Related Art

Generally, a camera and a keyboard are used as peripheral components of a personal computer (PC) and may be coupled to the personal computer via the universal serial bus interface of the personal computer. However, when the camera is detached from the PC, it may be easily misplaced and lost.

What is needed, therefore, is to provide a keyboard integrated with a camera module, in which the above problem is eliminated or at least alleviated.

DETAILED DESCRIPTION OF THE EMBODIMENTS

Figure 1:
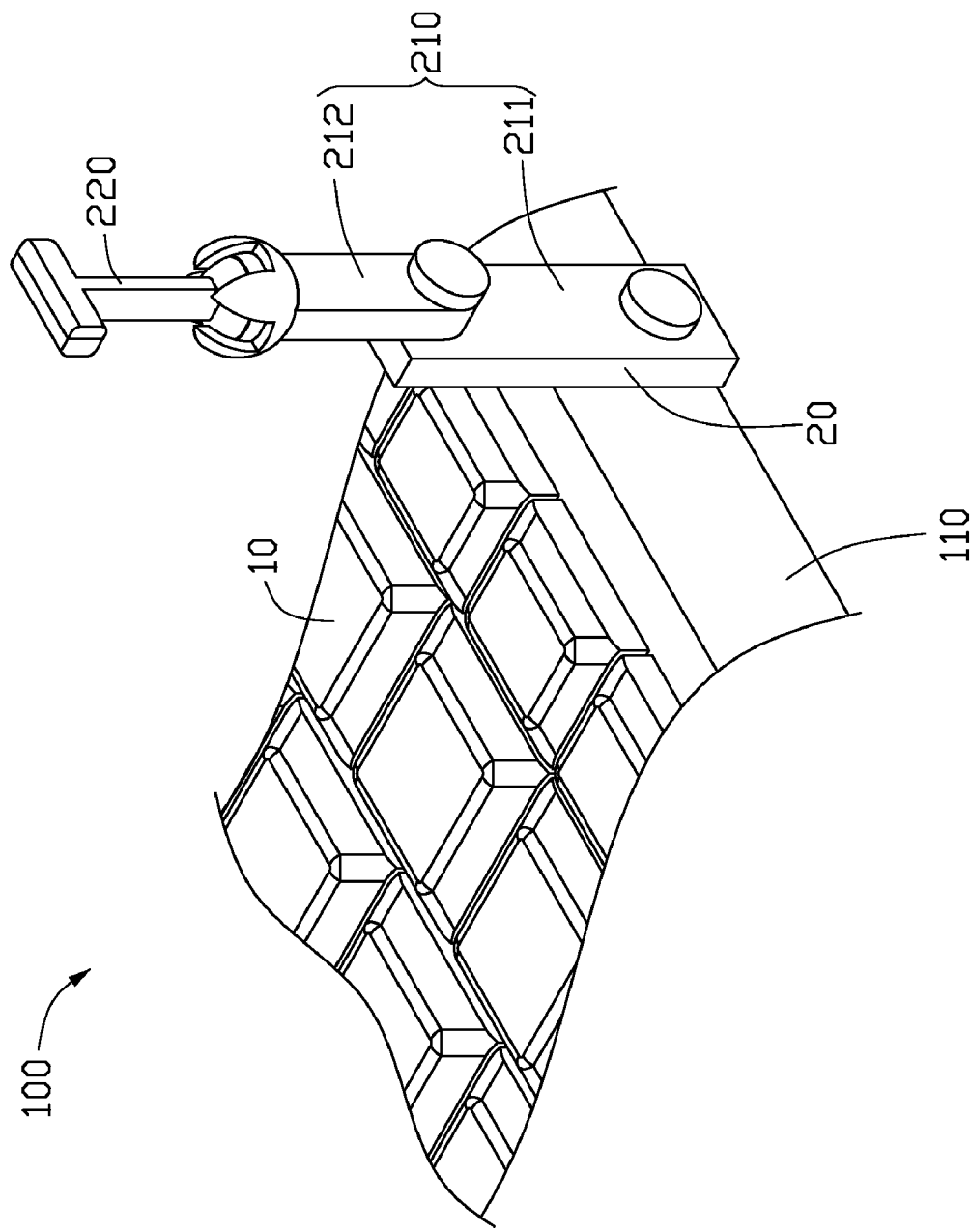
FIG. 1 is a partially isometric view of a keyboard integrated with a camera module according to an exemplary embodiment.
Figure 2:
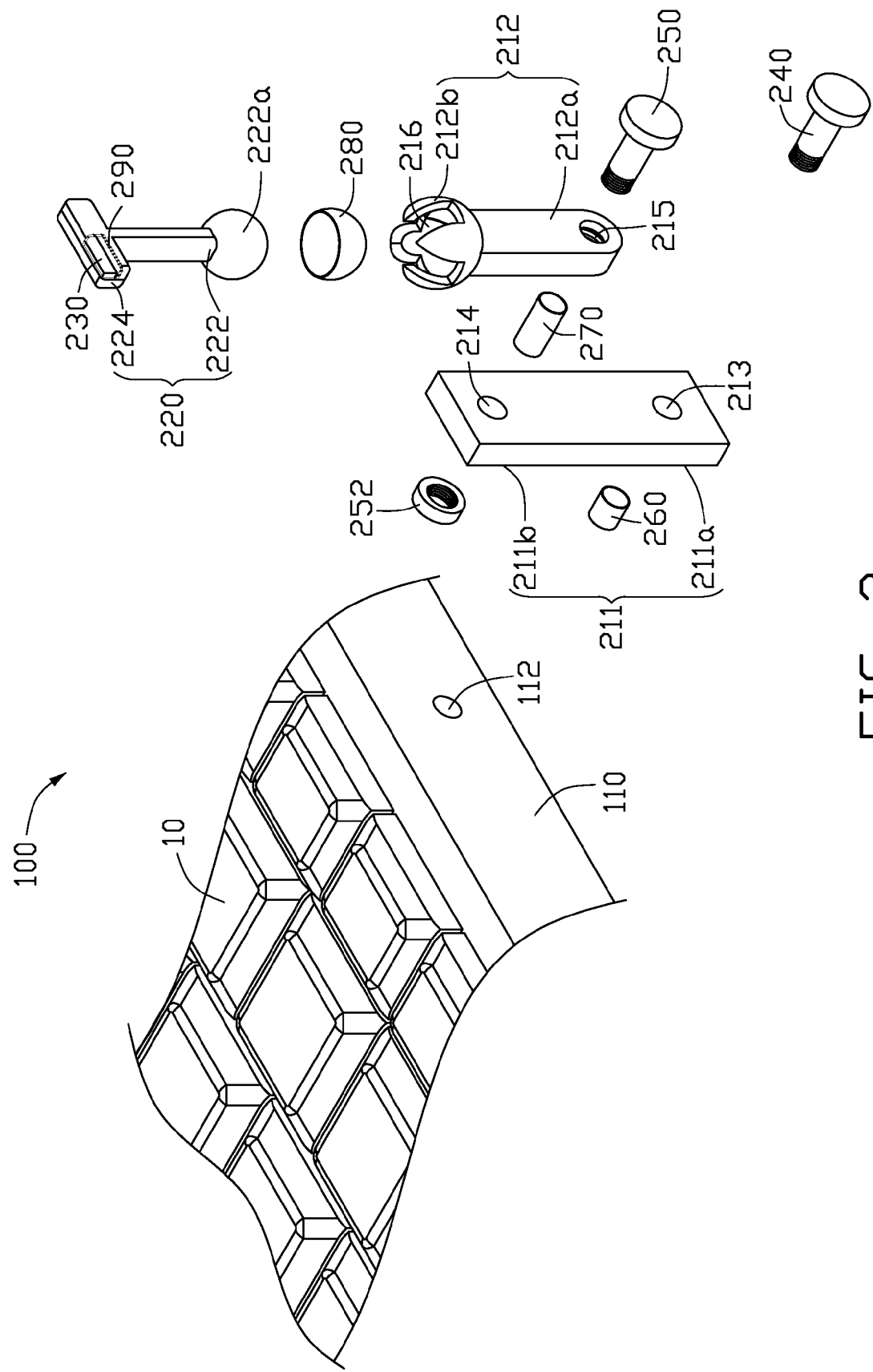
FIG. 2 is a disassembled view of the camera module of the keyboard of FIG. 1.

Referring to FIGS. 1 and 2, a keyboard 100 according to an exemplary embodiment includes a keyboard body 10 and a camera module 20 rotatably coupled to the keyboard body 10.

The keyboard body 10 includes a side surface 110. A first screw hole 112 is defined on the side surface 110.

The camera module 20 includes a support 210, a receiving portion 220 and a camera unit 230. Generally, the camera unit 230 may include a lens and an imaging sensor for being exposed to focused light via the lens.

The support 210 includes a first connecting portion 211 and a second connecting portion 212. The first connecting portion 211 and the second connecting portion 212 are flakes hinged to each other. The first connection portion 211 includes a first connecting end 211a and an opposite second connecting end 211b. The first connecting end 211a defines a first through hole 213 corresponding to the first screw hole 112. The second connecting end 211b defines a second through hole 214. The support 210 further includes a first bolt 240, a second bolt 250, a nut 252, a first sleeve 260 and a second sleeve 270. The first sleeve 260 sleeves the first bolt 240 and together with the first bolt 240 passes through the first through hole 213. As a result, the first bolt 240 is engaged in the first screw hole 112 so as to rotatably couple the first connecting portion 211 to the keyboard body 10. The second connecting portion 212 includes a third connecting end 212a and an opposite first receiving end 212b. The third connecting end 212a defines a third through hole 215 corresponding to the second through hole 214 of the second connecting end 211b. The second sleeve 270 sleeves the second bolt 250 and together with the second bolt 250 passes through the third through hole 215 and the second through hole 214, and finally the second bolt 250 is engaged with the nut 252. As a result, the second connecting portion 212 is rotatably coupled to the first connecting portion 211. The first receiving end 212b defines a first receiving chamber 216. The first receiving chamber 216 is ball-shaped in this embodiment.

The receiving portion 220 includes a rotating end 222, a second receiving end 224 and a third sleeve 280. The rotating end 222 includes a ball-shaped block 222a suitable for being fixedly received in the third sleeve 280. The third sleeve 280 is rotatably received in the first receiving chamber 216. Therefore, when the receiving portion 220 together with the third sleeve 280 is rotated relative to the second connecting portion 212, the ball-shaped block 222a is protected from being worn down. The second receiving end 224 defines a second receiving chamber 290. The camera unit 230 may be fixed in the second receiving chamber 290 by adhesive, screwing, or other suitable means. The second receiving end 224 further defines a light incident hole (not shown) for allowing light to be received by the camera unit 230. An end of a wire (not shown) may pass through the second receiving end 224 and be electrically coupled to the camera unit 230 to transmit signals generated by the camera unit 230. Another end of the wire may be coupled inside the keyboard body 10.

Since the sleeves 260, 270, 280 are used in the through holes 213, 214, 215 and the first receiving chamber 216, a holding force is generated between the first sleeve 260 and an inner wall of the first through hole 213, and between the second sleeve 270 and an inner wall of the second through hole 214, and between the third sleeve 280 and an inner wall of the first receiving chamber 216. Therefore, the first connecting portion 211 may be rotated around the first bolt 240 by an external force, applied by a user, that is greater than the holding force, and the first connecting portion 211 will move to and stay at the position along it's arc of rotation at the point where the external force is removed. The second connecting portion 212 may also be rotated around the second bolt 250 by the external force and may hold in any position along it's arc of rotation at the point where the external force is removed, and so that the receiving portion 220 may be rotated around the ball-shaped block 222a by the external force and may hold in any position along it's arc of rotation at the point where the external force is removed.

Figure 3:
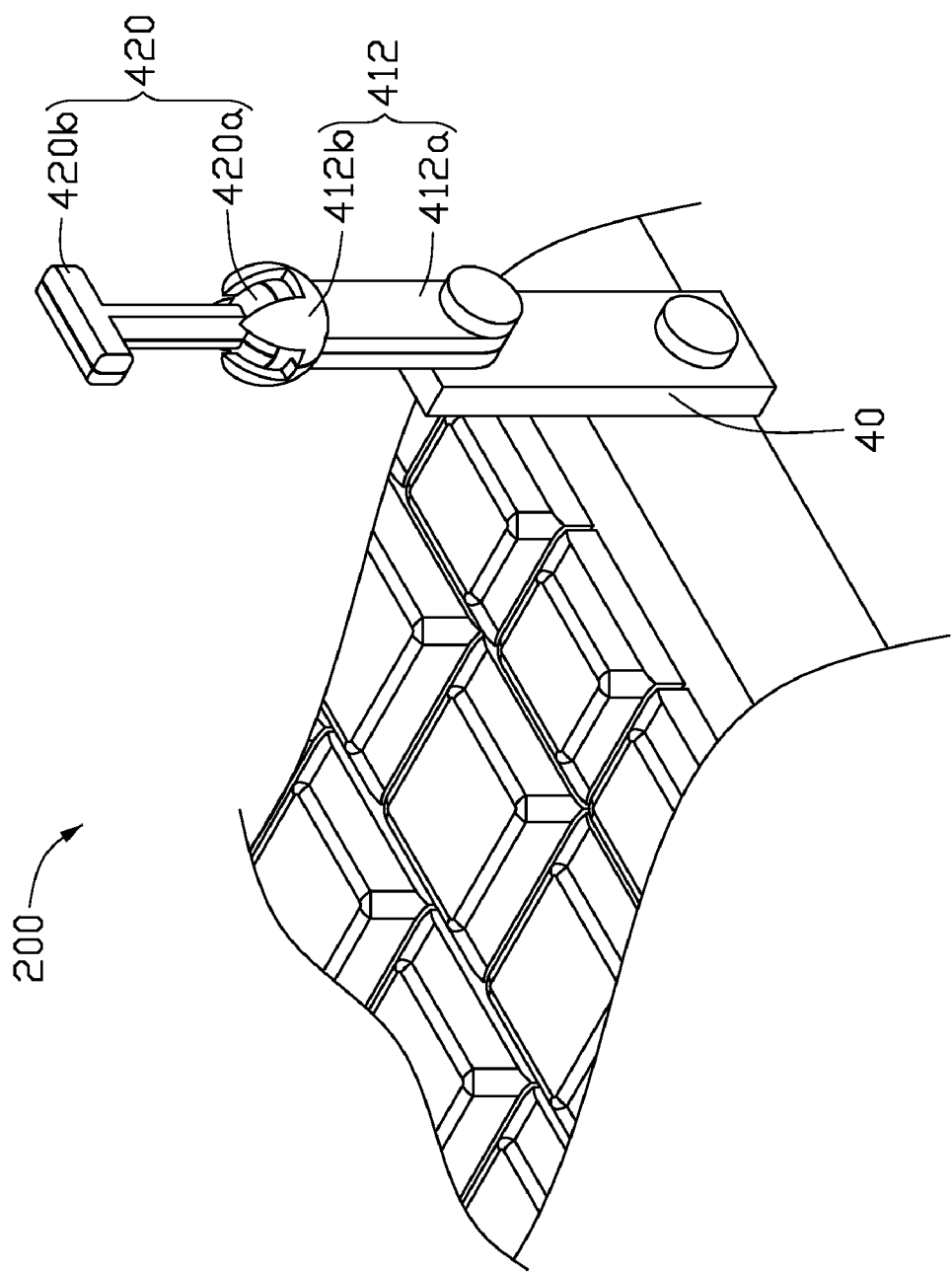
FIG. 3 is a partially isometric view of a keyboard integrated with a camera module according to another exemplary embodiment.
Figure 4:
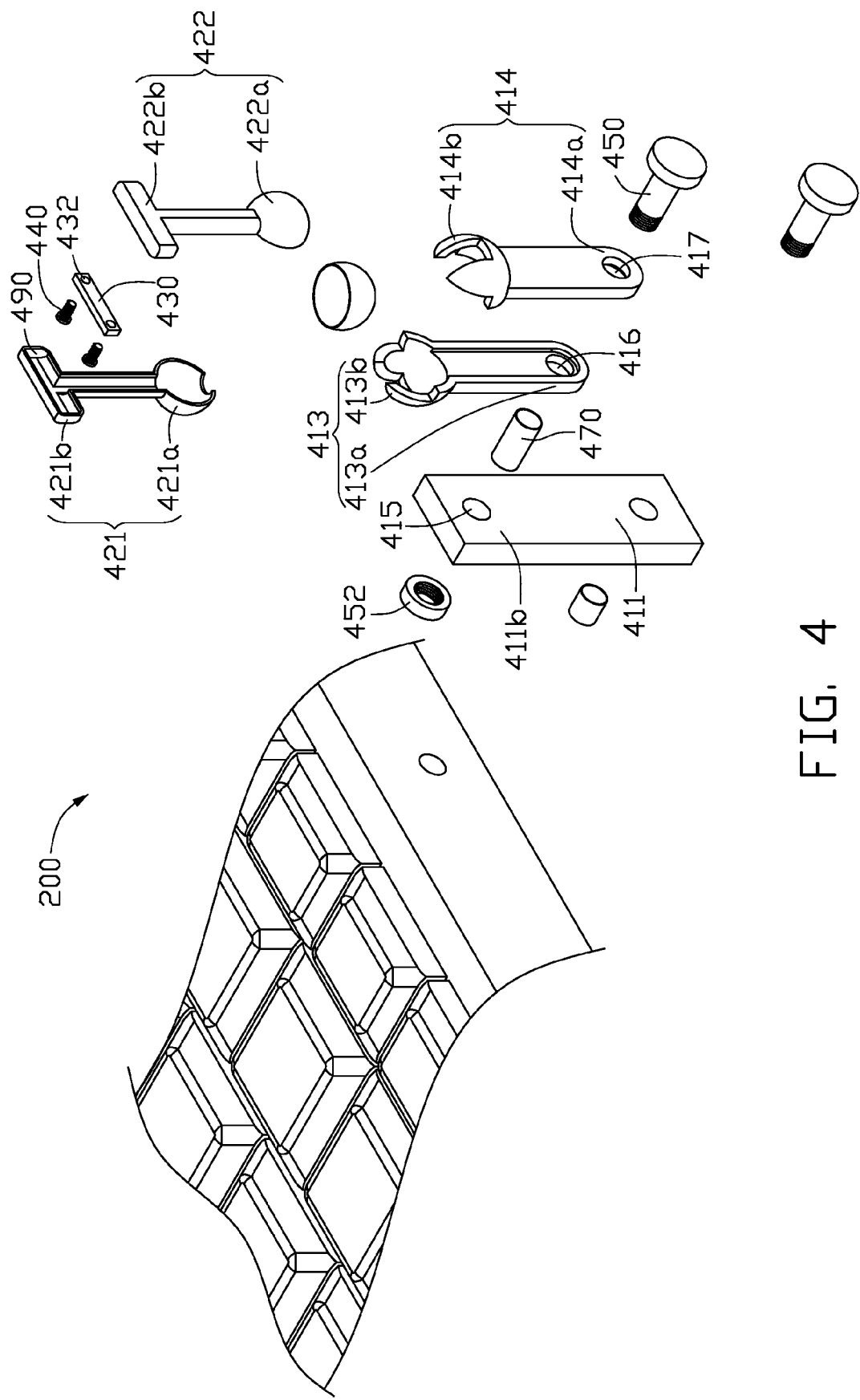
FIG. 4 is a disassembled view of the camera module of the keyboard of FIG. 3.

Referring to FIGS. 3 and 4, a keyboard 200 according to another embodiment is shown. Differences between the keyboard 100 and the keyboard 200 are that the camera module 40 further includes two third bolts 440 and the camera unit 430 defines two second screw holes 432.

The second connecting portion 412 includes a first member 413 and a second member 414 coupled to the first member 413. The first member 413 includes a first end 413a and an opposite second end 413b. The second member 414 includes a third end 414a and an opposite fourth end 414b. The first end 413a and the third end 414a cooperatively form a third connecting end 412a. The second end 413b and the fourth end 414b cooperatively form a first receiving end 412b. The first end 413a defines a third through hole 416 corresponding to the second through hole 415. The third end 414a defines a fourth through hole 417 corresponding to the second through hole 415 and the third through hole 416. The second sleeve 470 sleeves the second bolt 450 and together with the second bolt 450 passes through the fourth through hole 417, the third through hole 416 and the second through hole 415 and finally the second bolt 450 is engaged with the nut 452. As a result, the second connecting portion 412 is rotatably coupled to the first connecting portion 411.

The receiving portion 420 includes a third member 421 and a fourth member 422. The third member 421 includes a fifth end 421a and an opposite sixth end 421b. The fourth member 422 includes a seventh end 422a and an opposite eighth end 422b. The fifth end 421a and the seventh end 422a cooperatively form a rotating end 420a. The sixth end 421b and the eighth end 422b cooperatively form a second receiving end 420b.

Two screw holders (not shown) may be set inside the second receiving end 420b corresponding to the two second screw holes 432 respectively. The third bolt 440 is engaged in the second screw hole 432. As a result, the third bolt 440 is engaged with the screw holder inside the eighth end 422b so as to fix the camera unit 430 inside the second receiving end 420b by screwing.

In summary, the keyboard can be integrated with a camera module. Therefore, the camera module is not detached from the PC and hence is not subjected to being misplaced or lost. Further, the camera module can be held in a desirable position, which is convenient for a user to get a desirable picture.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A keyboard comprising:
a keyboard body comprising a side surface; and
a camera module, the camera module comprising a support, a receiving portion and a camera unit, the support comprising a first connecting portion and a second connecting portion, the first connecting portion comprising a first connecting end and an opposite second connecting end, the second connecting portion comprising a third connecting end and a first receiving end opposite to the third connecting end, the receiving portion comprising a rotating end and an opposite second receiving end, the support being rotatably coupled to the keyboard body by the first connecting end, the rotating end being rotatably received in the first receiving end and the camera unit being received in the second receiving end; wherein the first connecting portion and the second connecting portion are elongated flakes hinged to each other.

2. The keyboard as claimed in claim 1, wherein the side surface defines a first screw hole; the first connecting end defines a first through hole corresponding to the first screw hole; the keyboard further comprises a first bolt and a first sleeve, the first sleeve sleeving the first bolt and together with the first bolt passing through the first through hole, thereby the first bolt being engaged in the first screw hole.

3. The keyboard as claimed in claim 2, wherein the second connecting end is rotatably coupled to the third connecting end.

4. The keyboard as claimed in claim 3, wherein the second connecting end defines a second through hole, and the third connecting end defines a third through hole corresponding to the second through hole; the keyboard further comprises a second bolt, a second sleeve and a nut, the second sleeve sleeving the second bolt and together with the second bolt passing through the second hole and the third through hole, thereby the second bolt being engaged with the nut.

5. The keyboard as claimed in claim 2, wherein the support comprises a first connecting portion and a second connecting portion; the first connecting portion comprises the first connecting end and an opposite second connecting, end; the second connecting portion comprises a first member and a second member coupled to the first member, the first member comprising a first end and an opposite second end, the second member comprising a third end and an opposite fourth end, the first end and the third end cooperatively forming a third connecting end, and the second end and the fourth cooperatively forming the first receiving end, the second connecting end being rotatably coupled to the third connecting end.

6. The keyboard as claimed in claim 5, wherein the second connecting end defines a second through hole, and the first end defines a third through hole corresponding to the second through hole, and the second end defines a fourth through hole corresponding to a third through hole; the keyboard further comprises a second bolt, a second sleeve and a nut, the sleeve sleeving the second bolt and together with the second bolt passing through the second through hole, the third through hole and the fourth through hole in turn, thereby the second bolt being engaged with the nut.

7. The keyboard as claimed in claim 1, wherein the first receiving end defines a first receiving chamber; the keyboard further comprises a third sleeve, and the rotating end comprises a ball-shaped block, the third sleeve being configured for sleeving the ball-shaped block and being received in the first receiving end.

8. The keyboard as claimed in claim 1, wherein the receiving portion comprises a third member and a fourth member coupled to the third member; the third member comprises a fifth end and an opposite sixth end and the fourth member comprises a seventh end and an opposite eighth end, the fifth end and the seventh end cooperatively forming the rotating end, the sixth end and the eighth end cooperatively forming the second receiving end,.

9. The keyboard as claimed in claim 1, wherein the camera unit is fixedly received in the second receiving end by adhesive.

10. The keyboard as claimed in claim 1, wherein the camera unit is fixedly received in the second receiving end by screwing.

* * * * *